Figure 4A:
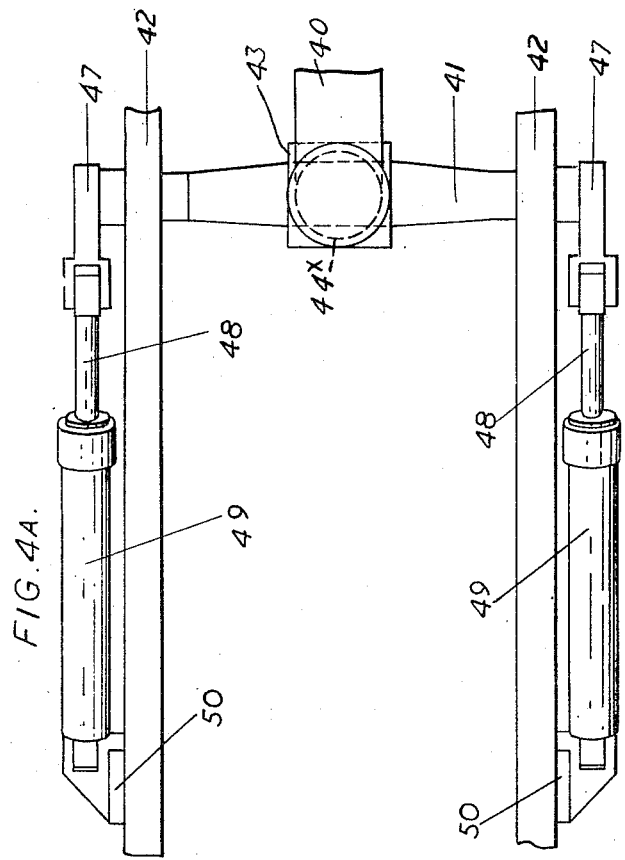

Dec. 3, 1957 W. WHARTON 2,815,223
TRACTOR VEHICLES WITH TRAILERS
Filed Oct. 12, 1955 5 Sheets-Sheet 1
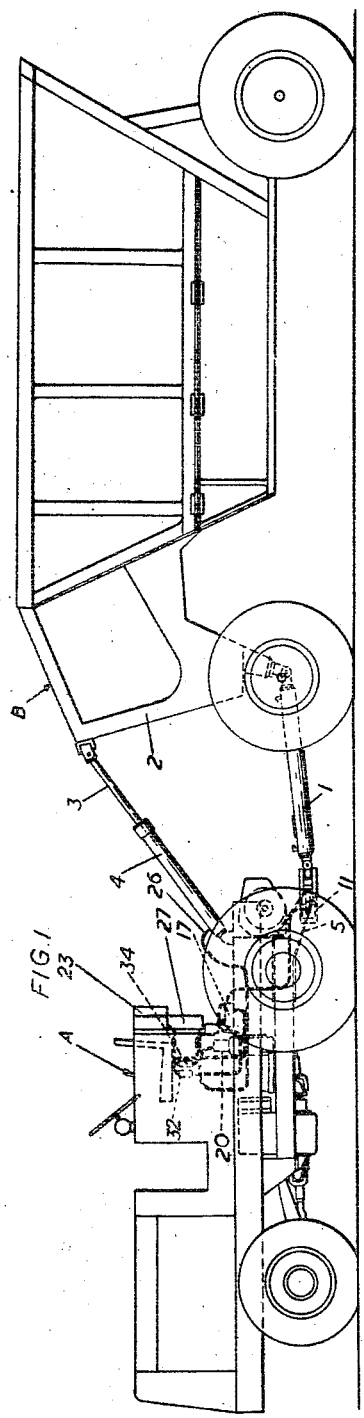
Inventor
William Wharton
By A. Knight Broad
Attorney

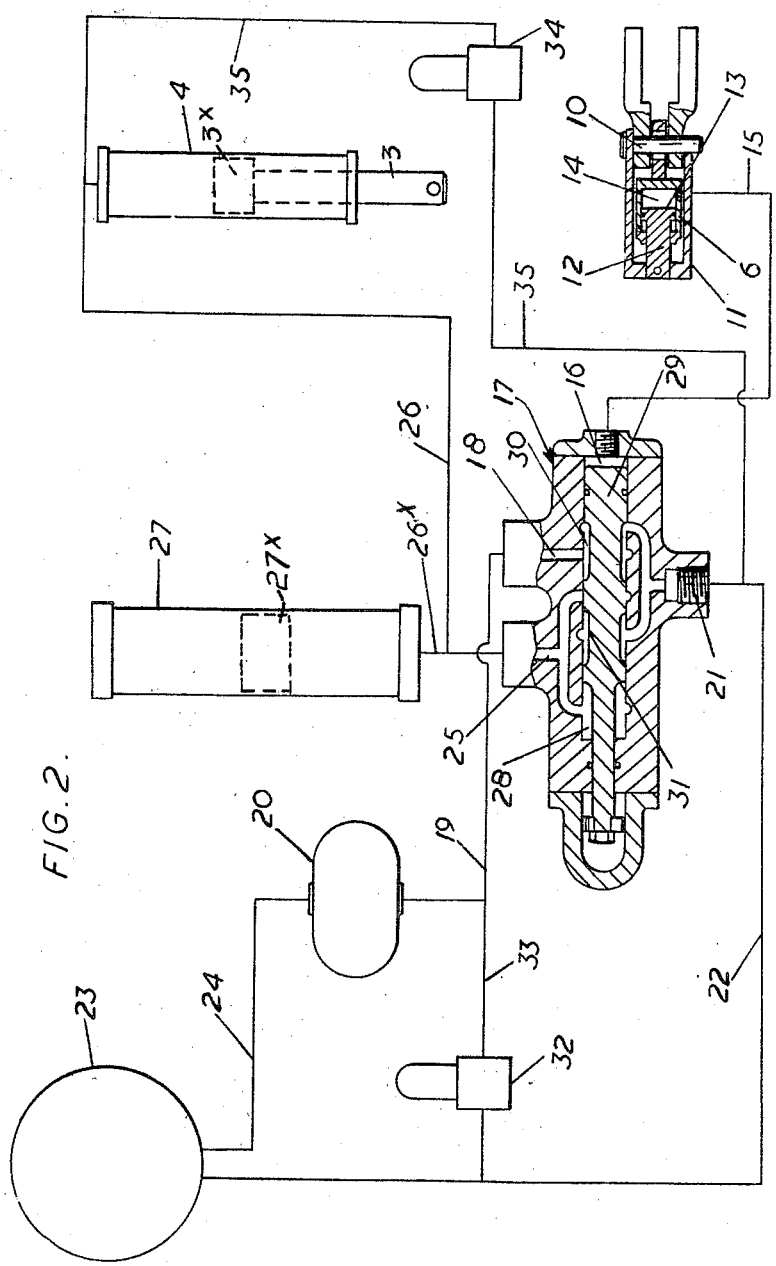

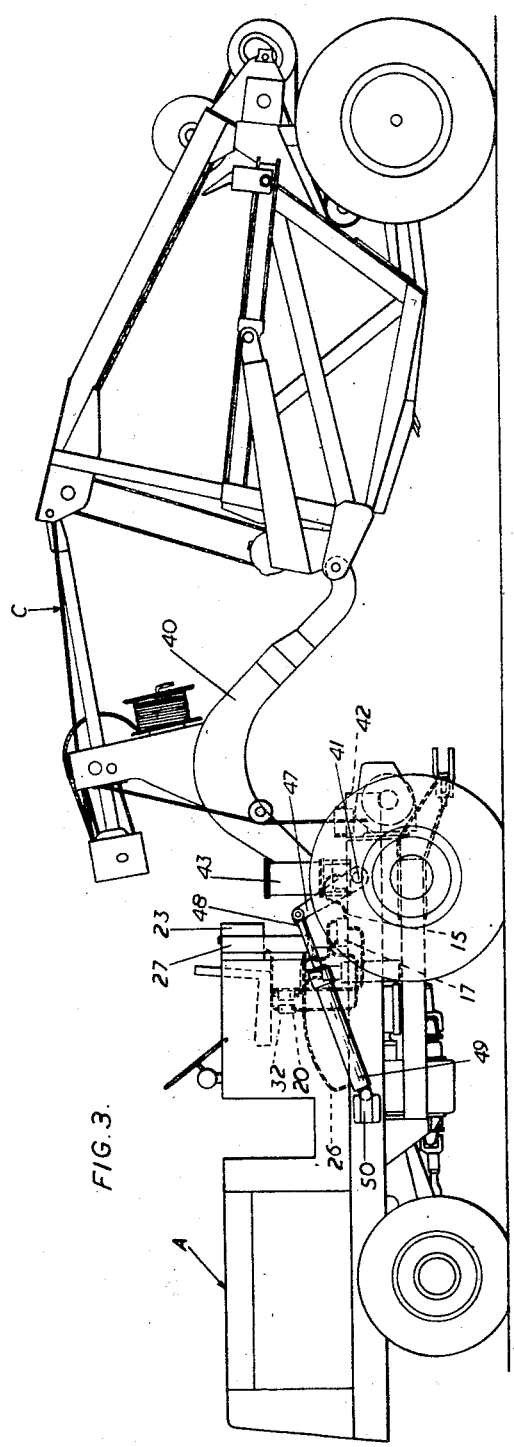

Dec. 3, 1957   W. WHARTON   2,815,223
TRACTOR VEHICLES WITH TRAILERS
Filed Oct. 12, 1955   5 Sheets-Sheet 4

Inventor
William Wharton.
By
A. Knight Coad
Attorney

Dec. 3, 1957   W. WHARTON   2,815,223
TRACTOR VEHICLES WITH TRAILERS
Filed Oct. 12, 1955   5 Sheets-Sheet 5
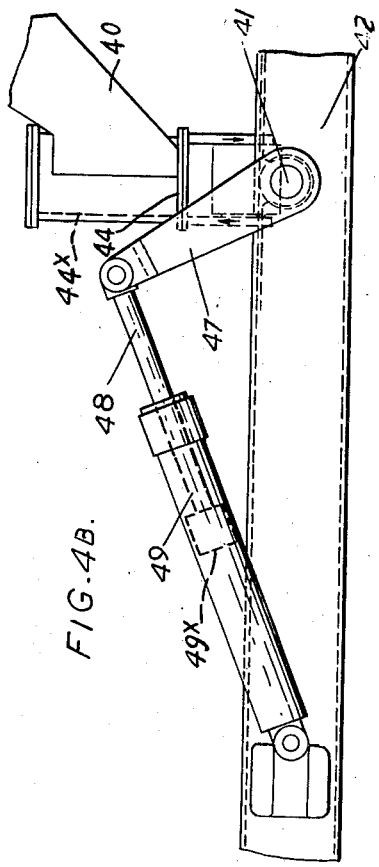
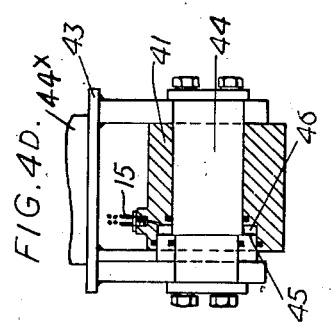
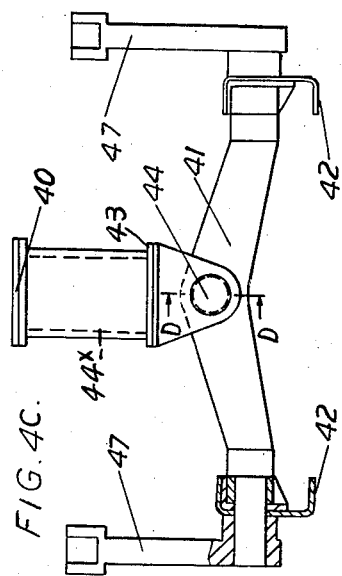
Inventor
William Wharton
By
A. Knight Broad
Attorney

2,815,223

TRACTOR VEHICLES WITH TRAILERS

William Wharton, Hemel Hempstead, England

Application October 12, 1955, Serial No. 540,089

3 Claims. (Cl. 280—406)

This invention relates to tractor vehicles with trailers.

The reaction to the turning effort applied to the wheels of a tractor, with a trailer attached, tends to rotate the tractor bodily in a sense opposite to the direction of rotation of the wheels. Consequently there is a tendency, regardless of whether the front, back or both wheels are driven, for the front wheels of the tractor to be lifted off the ground. The weight of the tractor ordinarily counteracts this reaction until it is balanced by it, but nevertheless the front wheels exert little or no pressure on the ground and therefore cannot usefully be used for driving or steering the tractor.

The object of this invention is to counteract this disadvantage and to this end there is provided a tractor-trailer combination having means for transferring the torque reaction of the tractor driving mechanism to the trailer whereby the pressure exerted on the ground by the front and rear wheels of the tractor may automatically be kept substantially equal.

The torque reaction varies with the actual pull exerted at the draw bar or the like of a tractor-trailer combination and according to a feature of this invention control for the transfer means is included in the draw bar or the like connection and is operable automatically on variations in the actual pull exerted at the draw bar or the like.

Other features of this invention will become apparent from the following description of embodiments thereof, and the appended claims.

In the accompanying drawings:

Figure 1 illustrates a tractor-trailer combination to which the present invention has been applied, Figure 2 is a diagrammatic lay out, on a larger scale, of the parts of the transfer means provided in the tractor-trailer combination illustrated in Figure 1, Figure 3 illustrates another tractor-trailer combination to which the present invention has been applied, and Figures 4A, 4B, 4C and 4D show, on a larger scale, details of the tractor-trailer connection of the combination illustrated in Figure 3, Figure 4A being a plan view, Figure 4B a side elevation, Figure 4C a rear elevation and Figure 4D a section on the line D—D of Figure 4C.

In Figure 1 there is shown a tractor A in combination with a four wheel trailer B. The trailer is connected to the tractor by means of a draw bar 1 provided at each end with suitable universal joints.

The trailer B includes at its forward end an upstanding element 2 to which is pivotally connected one end of a rod 3 carrying at its other end a piston $3^x$ which is disposed in a hydraulic cylinder 4. The cylinder 4 is connected to the tractor chassis, the piston $3^x$, cylinder 4 and rod 3 being as a whole forwardly and downwardly inclined from the front of the trailer to a point on the rear end of the tractor chassis.

The tractor chassis frame is provided at each side with a rearwardly and downwardly extending member 5, the two members being rigidly connected by a cross bar 6. The draw bar connection is through the intermediary of this cross bar 6 as will now be explained with particular reference to Figure 2.

The draw bar 1 is connected by means of a vertical pin 10 to a member 11 which embraces the cross bar 6 and is capable of a small backward and forward sliding movement with respect thereto, the member 11 having rigidly secured therein a rearwardly extending pin 12 carrying a piston 13. This piston is slidably disposed in a chamber 14 in the cross bar 6 which chamber is filled with hydraulic fluid on the side of the piston 13 opposite to the pin 12.

The chamber 14 is connected by a pipe 15 to a chamber 16 at one end of a control valve, indicated generally by the reference numeral 17. An inlet 18 of this control valve is connected by a pipe 19 to a pump 20, and an outlet 21 is connected by a pipe 22 to a tank 23 for hydraulic fluid, the tank being connected by a pipe 24 to a pump 20.

Another outlet 25 of the control valve 17 is connected by a pipe 26 with the cylinder 4, a branch $26^x$ in the pipe 26 communicating with the fluid chamber of an accumulator 27 containing hydraulic fluid and compressed air separated by a piston $27^x$. The outlet 25 is in permanent communication with a chamber 28 at the end of the control valve remote from the chamber 16.

The piston 29 of the control valve 17 has two spaced annular grooves 30 and 31 in the periphery thereof. It will be understood that this whole system is normally filled with hydraulic fluid, and that the parts thereof may be mounted in any suitable manner on the tractor.

During steady towing of the trailer by the tractor without variation of tractive effort the piston 29 occupies the position shown in Figure 2. The pump 20, which is driven by any suitable means from the engine of the tractor, operates continuously to pump hydraulic fluid passing to it from the tank 23 to the inlet 18 of the control valve, into the groove 30 in the piston 29 and so to the outlet 21, into the pipe 22 and back to the tank 23. The fluid pressure in the accumulator 27 acting in the chamber 28 is balanced by the fluid pressure in the chamber 14 acting in the chamber 16 and the piston 29 remains stationary. The fluid pressure in the accumulator 27 also acts on the piston $3^x$ in the cylinder 4 which counteracts the tendency of the tractor body to lift or rotate about the back axle thereof.

An increase on the draw bar pull causes the piston 13 to be moved rearwardly in chamber 14 forcing hydraulic fluid therefrom into the pipe 15 and so into the chamber 16 of the control valve 17. The piston 29 is thus caused to move to the left as seen in Figure 2. This isolates the inlet 18 from the outlet 21, but puts it into communication through the groove 30 with the outlet 25 so that hydraulic fluid is then pumped along the pipe $26^x$ to the accumulator 27 in which, together with the cylinder 4 the pressure is increased. This increases the force counteracting the tendency of the tractor body to lift or rotate about the back axle thereof.

When this increased force reaches a value appropriate to the increased draw bar pull, pressure in the pipes 26, $26^x$ causes fluid to flow back to the chamber 28 and the piston 29 is moved to the right again to its initial position, thus putting the inlet 18 into communication with the outlet 21 again.

During the movements of the piston 29 between its end positions in the control valve it passes momentarily through a position in which the inlet 18 is isolated from both outlets 21, 25 and a relief valve 32 is provided in a pipe 33 communicating the pipe 19 with the pipe 22.

Occasions may arise causing a sudden movement of the piston $3^x$ in the cylinder 4 resulting in a momentary excessive increase in the pressure in the hydraulic system. A second relief valve 34 is arranged in a pipe 35 connecting the piston cylinder 4 with the pipe 22.

For the main movements of the piston $3^x$ which occur during normal towing of the trailer over undulating ground, the accumulator 27 acts as a buffer or spring.

A decrease in draw bar pull will allow the pressure of the fluid in the accumulator 27 and the chamber 28 to move the piston 29 further to the right forcing fluid out of the chamber 16 into the chamber 14. This puts the outlet 25 of the control valve into communication with the outlet 21 through the groove 31. Fluid is let out of the accumulator 27, in which and in the piston cylinder 4 the pressure decreases. When this pressure is appropriate to the reduced draw bar pull the piston 29 returns to its initial position.

In Figure 3 there is shown a tractor A in combination with a two-wheel trailer vehicle C, the latter being connected to the tractor by a single draw bar member 40 disposed centrally of the rear axle of the tractor.

More specifically, as is clear from Figures 4A to 4D, a cross bar 41 is rotatably mounted in and extends between the side members 42 of the tractor chassis, the ends of the cross bar being of circular cross section but the central part thereof being of rectangular cross section and also upwardly bowed (see Figure 4C). The connector 43 for the draw bar member 40 is pivotally connected to the centre of the cross bar 41 by a horizontal pin 44 lying on the longitudinal axis of the tractor. The connector also includes a vertical pivot pin $44^x$ at right angles to the pin 44, the arrangement being such that the connector as a whole forms a universal coupling between the side members 42 and the draw bar member 40.

As is shown in Figure 4D the connector 43 is capable of a small backward and forward sliding movement on the pin 44 and carries a piston 45 which is slidably disposed in a chamber 46 which surrounds the pin 44 in the cross bar 41 and is filled with hydraulic fluid.

Rigidly mounted on each end of the cross bar 41 is an upstanding arm 47 to the upper end of which is pivotally connected a rod 48 carrying at its other end a piston $49^x$ (see Figure 4B) which is disposed in a hydraulic cylinder 49. The two cylinders are pivotally connected to brackets 50 secured to the side members 42 of the chassis frame.

A control valve 17, pump 20, tank 23, accumulator 27 with connecting pipes and relief valves are mounted on the tractor as described above with reference to Figure 1. The pipe 15 connects the control valve with the chamber 46, and the pipe 26 connects the control valve with the cylinders 49.

The operation of the hydraulic system will readily be understood from that previously given in connection with Figure 1.

The chambers 14 and 46 and the chambers 16 and 28 of the control valve may be replaced by hermetically sealed flexible capsules containing fluid.

It will also be understood that one tractor may be adapted for towing four or two wheel trailers.

I claim:

1. In combination a tractor vehicle and a trailer with interposed draw bar connecting means, said combination having a draw bar connector member on the tractor formed so as to define a chamber for a pressure transferring fluid medium; a piston element adapted to be connected to the draw bar of the trailer and arranged within said chamber so as to be capable of exerting on the fluid medium therein pressure directly proportional to the force of the draw bar pull; means controlled by the pressure exerted on the fluid medium in said chamber for exerting a downward thrust from the trailer to the tractor and thus counteracting the tendency of the latter, whilst towing the trailer, to rotate about its back axle, said means including a valve mounted on the tractor and forming an element in a closed circuit for pressure transferring fluid medium independent of said chamber and power means for circulating the fluid medium in said closed circuit, said valve having a control element which is subject to the pressure exerted on the fluid medium in said chamber for allowing the power means to cause a downward thrust on the tractor from the trailer which varies with the draw bar pull.

2. In combination a tractor vehicle and a trailer with interposed draw bar connecting means, said combination having a draw bar connector member on the tractor formed so as to define a chamber for hydraulic fluid; a piston element adapted to be connected to the draw bar of the trailer and arranged within said chamber so as to be capable of exerting on the hydraulic fluid pressure directly proportional to the force of the draw bar pull; means controlled by the pressure exerted on the hydraulic fluid in said chamber for exerting a downward thrust on the tractor from the trailer and thus counteracting the tendency of the latter, whilst towing the trailer, to rotate about its back axle, said means comprising a closed circuit for hydraulic fluid independent of the fluid in said chamber and including means mounted on the tractor for continuously circulating the hydraulic fluid to and through the circuit, a cylinder and piston unit connected at one end with respect to the tractor and at the other end with respect to the trailer, a valve mounted on the tractor and having a control element which is subject to the pressure exerted on the hydraulic fluid in said chamber and is adapted on an increase in the draw bar pull to allow hydraulic fluid in said circuit to pass to said cylinder and piston unit to cause a downward thrust on the tractor from the trailer.

3. The combination as claimed in claim 2 wherein said circuit includes an accumulator mounted on the tractor and containing compressed air and hydraulic fluid separated by a piston, which accumulator is included in the circuit in parallel with said cylinder and piston unit with the chamber for the hydraulic fluid in communication with said circuit.

References Cited in the file of this patent

UNITED STATES PATENTS

| | | |
|---|---|---|
| 1,785,124 | Jett | Dec. 16, 1930 |
| 2,347,898 | Ferguson | May 2, 1944 |
| 2,527,343 | Wilson | Oct. 24, 1950 |
| 2,633,366 | Armington | Mar. 31, 1953 |